Figure 5:
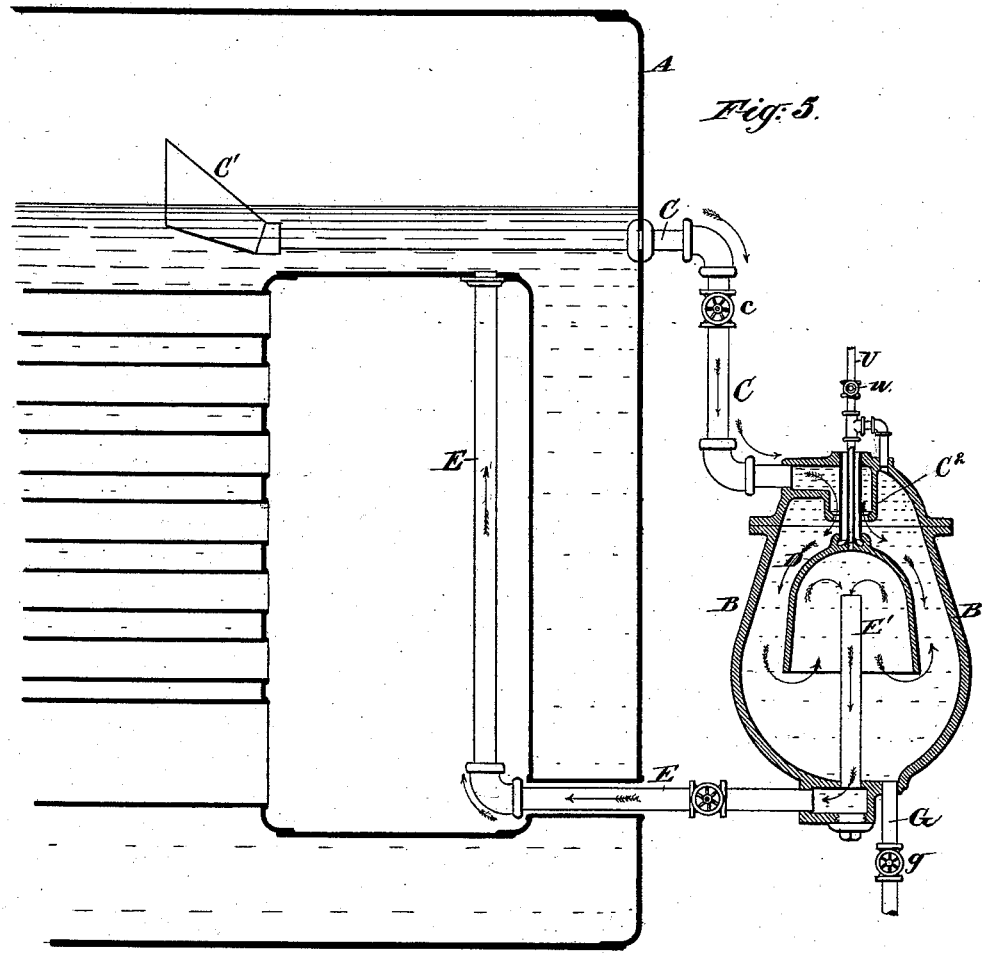

(No Model.) 2 Sheets—Sheet 1.
J. S. ROAKE.
STEAM BOILER CLEANER.
No. 389,718. Patented Sept. 18, 1888.
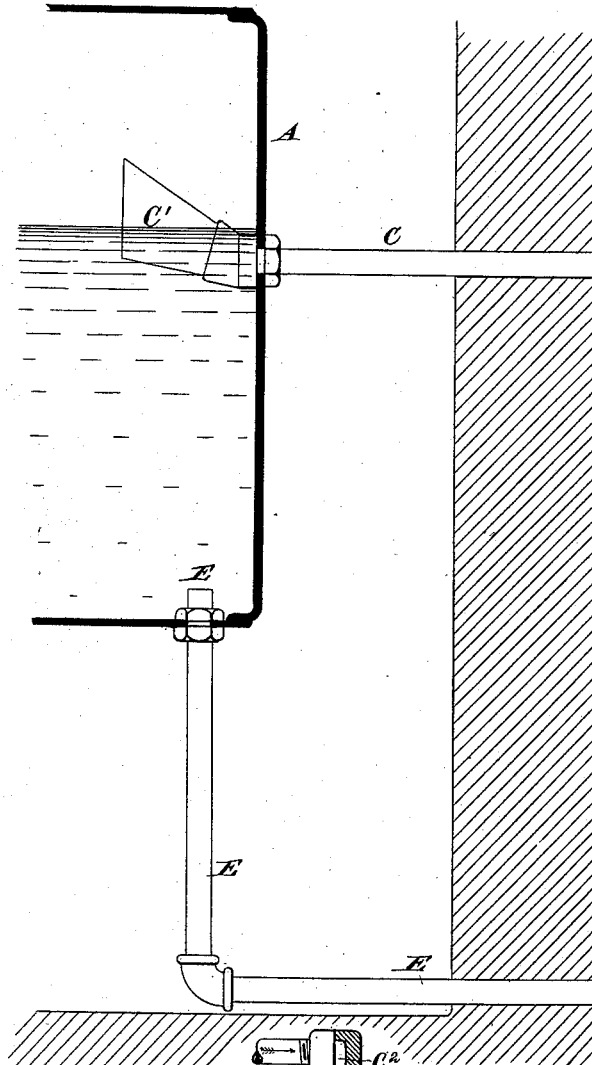
Fig. 1.
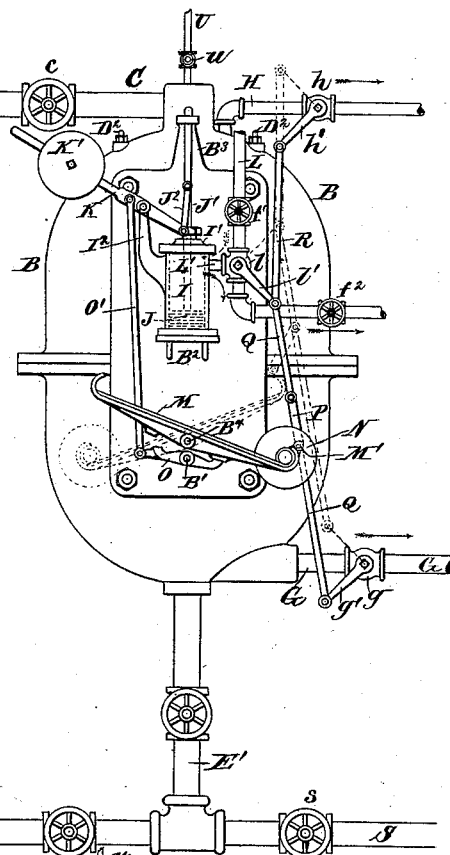
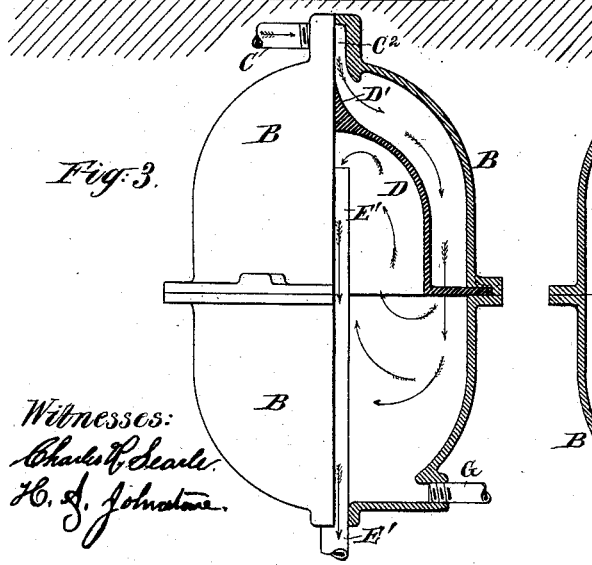
Fig. 3. Fig. 2.
Witnesses:
Charles R. Searle.
H. A. Johnstone.
Inventor:
John S. Roake,
by his attorneys
Thomas Drew Stetson.

(No Model.) 2 Sheets—Sheet 2.

J. S. ROAKE.
STEAM BOILER CLEANER.

No. 389,718. Patented Sept. 18, 1888.

Witnesses:
Charles R. Searle
H. A. Johnstone

Inventor:
John S. Roake
by his attorney
Thomas Drew Stetson

UNITED STATES PATENT OFFICE.

JOHN S. ROAKE, OF BROOKLYN, NEW YORK.

STEAM-BOILER CLEANER.

SPECIFICATION forming part of Letters Patent No. 389,718, dated September 18, 1888.

Application filed May 24, 1888. Serial No. 274,825. (No model.)

*To all whom it may concern:*

Be it known that I, JOHN S. ROAKE, of Brooklyn, Kings county, in the State of New York, doing business in New York city, have invented a certain new and useful Improvement in Steam-Boiler Cleaners, of which the following is a specification.

I provide a cleaning-chamber adjacent or convenient to the boiler, with its upper portion receiving water from the boiler at the water-level. Another pipe opening into the cleaning-chamber a little lower extends downward and backward to connect with a low point in the boiler. The arrangement induces a slow circulation, the water moving outward through the upper connection from the boiler to the cleaning-chamber, and moving back through the other—the lower connection—from the cleaning-chamber to the boiler. It is found that with many kinds of water solid or flocculent matter will accumulate in small masses in the water, which will be thrown to the surface by the ebullition in the boiler, and yet will sink if withdrawn with the water into a separate vessel and allowed to rest. In my apparatus there is a period during which a current of water carrying such solid particles moves outward and is deposited in the chamber, so that the water returns from the cleaning-chamber purified by decantation. This general principle has been before carried out in apparatus for this purpose. I have made important improvements. I give such form to the parts that the water moves down through a large annular space extending around the whole interior of the cleaning-chamber, then is caused to move inward and rise through the whole central space in the chamber to reach the exit, which is in the interior near the top. This makes the whole horizontal area of the cleaning-chamber available for the water to perform a slow descending, slow inward, and slow ascending movement. The conditions are favorable for the separation of all insoluble matter and the precipitation to the bottom of all which will sink. The particles which tend to float also find favorable conditions to allow them to separate and to gather in an annular ring at the top. I provide for blowing out such insoluble matter at intervals. In ordinary practice the proportion of solid matter which sinks is much greater than that which rises. There is a liability, through the neglect of attendants, that the solid matter may gather, at first loosely and afterward more compactly, in the lower portion of the chamber and accumulate until the apparatus is clogged. I have devised an automatic mechanism for blowing out the solid matter from the bottom of the chamber at intervals. I provide for graduating the frequency of this blowing operation and also the length or duration of each.

The accompanying drawings form a part of this specification, and represent what I consider the best means of carrying out the invention.

Figure 6:
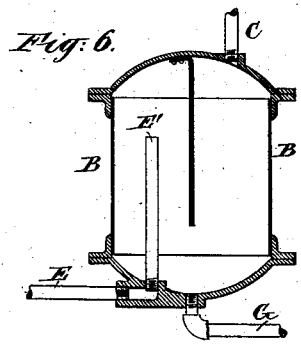
Figure 4:
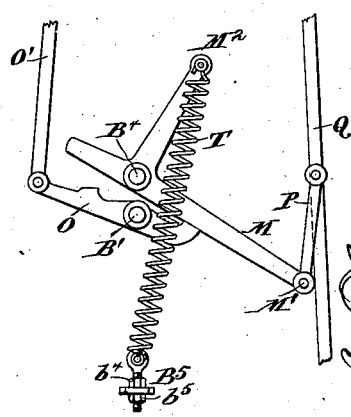

Figure 1 is a vertical section of a portion of the boiler with the cleaning-chamber and automatic mechanism in elevation. Fig. 2 is a section through the cleaning-chamber. Fig. 3 is a section, partly in elevation, showing a modification in the means for supporting the dome. Fig. 4 shows a modification in the provision for causing a prompt and full action of the automatic reversing mechanism adapted for marine boilers. Fig. 5 is a vertical section showing a portion of a marine boiler of the return tubular type with this invention attached. In this and in all the figures the drawings show the novel parts, with so much of the ordinary parts as is necessary to show their relation thereto. Fig. 6 is a vertical section showing a modified form of the cleaning-chamber.

Similar letters of reference indicate corresponding parts in all the figures where they occur.

A is a portion of the boiler-shell; B, the shell of the adjacent chamber, which I will call the "cleaning-chamber." It is for convenience made in two pieces flanged together and secured by bolts.

C is the upper pipe. It connects the top of the chamber B with the boiler-shell at about the height to which the water-level is to be maintained. Within the boiler-shell A is a casing or skimmer, C', of sheet metal or other suitable material, forming a flared extension of the pipe C. The other end of this pipe connects with a passage, C², which is cored or otherwise produced in a thick portion of the shell B. The inner end of this passage C² is vertical.

Referring to Figs. 1 and 2, D is an inverted cup, of cast-iron or other suitable material, having a diameter about two-thirds that of the shell B. It has a general dome shape, but its top is pointed, as indicated by D'. It is held in place by rods D², connecting it with the shell B and holding it firmly in the position shown. A stream of water flowing through the pipe C and entering the cleaning-chamber through the passage C² is divided centrally by the point D'.

E is the bottom pipe. It leads from a low point in the boiler-shell A to the bottom of the cleaning-chamber B. It connects by an elbow and T-coupling with a vertical pipe, E', which enters the bottom of the cleaning-chamber, and extends up centrally into the hollow dome D.

G is a blow-off pipe controlled by a cock, $g$. When this cock is open, the water escapes strongly from the bottom of the cleaning-chamber, carrying with it any solid material which has been there deposited. A cock, $c$, controls the flow through the pipe C.

H is a pipe controlled by a cock, $h$, and allowing an escape from the interior of the cleaning-chamber at the top.

In the use of the apparatus the cleaning-chamber B and the connecting-pipes C and E are filled with water, and during the greater portion of the time the cock $c$ is wide open. The water, becoming partially cooled in the pipes C and cleaning-chamber B, flows downward from the passage C², being spread by the point D' and dome D. It descends in a gentle current through the liberal annular space exterior to the dome, moves gently inward and upward in the interior of the dome, and flows down through the pipe E' and back to the boiler through the pipe E. In its passage through the cleaning-chamber most of the solid matter settles to the bottom, but a small portion rises to the top. This latter may be discharged by opening the cock $h$.

B' is a pin or fixed horizontal shaft bolted to the lower portion of the cleaning-chamber, or otherwise firmly supported. On this pin are loosely-mounted parts, which are rocked at intervals, as will appear farther on.

I is an upright cylinder, of cast-iron or other suitable material, mounted on the bracket B², cast or otherwise firmly attached on the side of the cleaning-chamber B. It is equipped with a tight-fitting cover, I', through a stuffing-box in which plays a piston-rod, J', connecting to a piston, J. (Shown in dotted lines.) The piston-rod J' is guided by a bracket, B³, and connects by links J² with an unequally-divided lever, K, which latter turns on a pin in the arm I².

L is a pipe communicating with the pipe C, or otherwise having a free connection with the boiler. It is provided with a branch, L', leading into the upper portion of the cylinder I. The flow through this pipe L and its branch L' is controlled by a two-way cock, $l$, having an elbowed passage through it. There are also on this pipe L two other cocks, $f'$ and $f^2$, the former above and the latter below the cock $l$.

The lever K carries a weight, K', on the long arm, the gravity of which tends to raise the piston J. A link, O', connects the long arm of the lever K to a lever, O, turning on the horizontal shaft B', before referred to. On a shaft, B⁴, just above B', is loosely mounted an easily-rocking cradle, M, which is adapted to support a heavy roller, N, and allow it to roll freely from one end to the other. The cradle is formed with an eye, M'. The eye M' connects by a link, P, to a link, Q, one end of which is attached to an arm, $l'$, on the cock $l$. The other end connects to an arm, $g'$, on the cock $g$.

R is a link leading from the lever $l'$ to an arm, $h'$, on the cock $h$.

The water in the pipe L subject to boiler-pressure is allowed to slowly pass the cock $f'$, and is directed by the cock $l$ into the cylinder I, above the piston. Its entrance depresses the piston and slowly turns the lever K, raising the weight K' and turning the lever O, and consequently the cradle M. When this action has proceeded to a sufficient extent to bring the cradle level and a little farther, the weight or roller N, being actuated by gravity on its inclined support, rolls from one end to the other of the cradle M. The effect of this transfer of its gravity is to rapidly tilt the cradle, and thereby, through the links P and Q, to shift the cocks $l$ and $g$. The cock $l$ is shifted into such position that the water is allowed to escape from the cylinder I past the cocks $l$ and $f^2$. As the water thus slowly escapes, the gravity of the weight K' depresses the long arm of the lever K and raises the piston J. This movement also, through the link O', turns the lever K, and consequently the cradle M, in the opposite direction to that first described. When this action has proceeded to a certain extent, carrying the cradle M a little past the level position, the roller N rolls on the inclined track to the other end of the cradle and induces a rapid shifting of the cradle back to its original position. In doing so it operates, through the links P and Q, to again shift the cock $l$ into the position to arrest the escape of water from the cylinder I and allow the slow reception of water from the boiler to that cylinder. This movement also closes the cock $g$, and the entire apparatus is as before, except that the solid matter which had been deposited in the bottom of the cleaning-chamber with a small quantity of water has been blown out through the pipe G, and the cleaning-chamber is full of clean water, ready to receive another deposit of heavy solid matter in the bottom. Any light solid matter which had accumulated in the top of the cleaning-vessel B has been blown out through the pipe H, and the top of the cleaning-vessel is again ready to receive a further accumulation of light material. The operation may continue for an indefinite period, the delay between the discharge being lessened by increasing the opening of the cock $f'$, and prolonged by decreasing such opening, the period of discharge being shortened by diminishing the opening of the cock $f'$ and reduced by increasing such opening.

S is an extension of the pipe E, controlled by a cock, $s$. The arrangement allows this pipe S to blow off directly from the boiler at intervals, when desired.

U is a small pipe controlled by a cock, $u$, arranged to allow the blowing out of any air which may accumulate in the interior of the dome D.

I attach importance to the fact that the pipe which conveys the water back from the proper high point in the cleaning-chamber to the boiler not only extends down to a point at or near the bottom of the boiler, but also extends considerably below and rises again, and that the rising portion of such pipe is bathed in the gaseous products of combustion flowing past at a high temperature from the furnace. I will mark that ascending portion of the pipe E'. The heating of the water in this portion causes it to rise actively and greatly promotes the circulation through the system. Indeed, the arrangement insures that if the circulation is very slow the heating in the part E' may even be carried to the extent of generating steam there, in which extreme case the circulation will be very greatly quickened. Ordinarily the steam will not be made there, but the heat absorbed from the hot products of combustion actively flowing past this single pipe will, by increasing the levity of the contained water, insure an active circulation through the entire system.

Another mode of attaining the same end as is attained by my rolling ball is by employing a spring attached to the tilting-lever M at a high point in the mid-length. Fig. 4 shows this modification. The spring T is attached to the arm $M^2$, and connects to a bracket, $B^5$, below. The tension of the spring may be adjusted by the nuts $b^4 b^5$. This form of the invention is particularly adapted for use on vessels which are liable to be more or less inclined—in sea-going vessels often very greatly inclined. The spring will work independent of gravity. When the apparatus is employed on sea-going vessels, the cleaning-chamber should be forward or aft of the boiler with which it is connected, so that the careening of the vessel to one side or the other will not materially affect its action.

Further modifications may be made without departing from the principle or sacrificing the advantages of the invention. I can hold the dome D by other means than by the rods $D^2$. Fig. 3 shows this dome supported by three or more radial arms extending out from its lower edge and received in recesses in the interior of the cleaning-chamber.

Some of the advantages of my invention may be attained without giving a dome form to the device D. For example, there may be a hanging partition, either straight or curved, extending downward from the top of the interior of the shell B. Fig. 6 shows such a modification, the water being admitted from the boiler in a gentle current through the pipe C on one side of such partition and taken out by the pipe E from a high point the other side of such partition. The water will in such case descend in a slow and gentle current one side of such partition, move gently across under it, and rise gently on the other side; but there will be less area for such horizontal movement of the water than with the dome form. I prefer the dome form.

I attach importance to the fact that the shell B and its several adjuncts are arranged at or below the level of the water in the boiler. This feature is particularly important in sea-going steamers, and is vitally essential in small steamers, as tugs, which are liable to great agitation in heavy weather. The water in the boiler and in the connection C and in the shell B is in such vessels liable to great fluctuations of level. In a heavy sea the water in the boiler swashes with great vigor from one side or end of the boiler to the other. Such agitations sometimes leave the skimmer C' entirely uncovered and at other times immerse it deeply in the water. During such periods my device or any other cannot take the scum successfully from the surface; but by reason of the arrangement of my shell B with its top down at or below the water-line of the boiler I avoid all risk of much steam coming into the chamber and defeating the operation during the brief periods while the water in the boiler is depressed, leaving the skimmer empty.

A cleaning-chamber arranged above the water-line is certain to receive steam and defeat the circulation whenever the water in the boiler sinks away from the skimmer. It is not practicable to introduce any connection analogous to a plumber's trap, because in high latitudes the water thus retained would induce mischief by freezing in winter whenever the boiler is out of use.

Fig. 5 shows the pipe E' extending upward within the back connection. The function of this portion of the pipe in receiving heat from the hot gases in which it is bathed, and causing the water within it to be heated and rarefied, and thus to quicken the circulation, is the same as in the other form.

I claim as my invention—

1. In a cleaning apparatus for steam-boilers, the dome D D', held concentrically within the cleaning-chamber B, in combination with each other and with a pipe, C, arranged to bring water from near the water-line of the boiler, and a pipe, E, arranged to return water from a point within the dome to a point at or near the bottom of the boiler, arranged to circulate the water and deposit the solid matter in the base of the cleaning-chamber, substantially as herein specified.

2. In a cleaning apparatus for boilers, the cleaning-chamber B and water-connections C and E, in combination with each other and with the weighted lever K K', cylinder I, piston J, connections J' J², pipe L, branch L', and cock $l$, blow-off pipe G and cock $g$, and connections, as P and Q, to tilting frame M, actuated by the lever K, arranged to automatically discharge the sediment from the bottom of chamber B at intervals, substantially as herein specified.

3. In an apparatus for cleaning boilers, the tilting cradle M and shifting-roller N, connected to the operating-cocks, as shown, in combination with the separate actuating-lever O and connections for operating it from the loaded lever K, and means, as the cylinder I, piston J, and cocks $l$ and $g$ and the pipes L, L', and G, for operating such lever, all arranged for joint operation, substantially as herein specified.

4. In a cleaning apparatus for boilers, having provisions, as the cock $l$ and its connections, for automatically discharging the sediment from the bottom of the cleaning-chamber at intervals, the cock $h$ and its operating-lever $h'$, and link R, connected to a working portion, as $l'$, arranged to provide a discharge from the top of the cleaning-chamber and thereby to periodically eject the light solid matter collecting at the top, substantially as herein specified.

5. A cleaning apparatus for steam-boilers, having a cleaning-chamber, B, with its top at or below the proper water-line of the boiler, a connection, C C', from the water-line of the boiler to the top of said chamber, a connection, E, from a point in the interior of the cleaning-chamber near the top to a low point in the boiler, and provisions, as the dome D, for compelling the water received through the connection C to descend and again rise in a gentle current in the cleaning-chamber, allowing the solid matter to descend as a sediment, in combination with each other and with provisions, as the cock, for blowing out from the bottom of the cleaning-chamber, arranged to retain the water in the cleaning-chamber, substantially as herein specified.

In testimony whereof I have hereunto set my hand, at New York city, this 12th day of May, 1888, in the presence of two subscribing witnesses.

JOHN S. ROAKE.

Witnesses:
   H. A. JOHNSTONE,
   M. F. BOYLE.